(12) United States Patent
Zhang

(10) Patent No.: US 9,437,149 B2
(45) Date of Patent: Sep. 6, 2016

(54) ARRAY SUBSTRATE AND DISPLAY

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Jiaxiang Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 39 days.

(21) Appl. No.: 14/366,132

(22) PCT Filed: Dec. 12, 2013

(86) PCT No.: PCT/CN2013/089284
§ 371 (c)(1),
(2) Date: Jun. 17, 2014

(87) PCT Pub. No.: WO2015/003461
PCT Pub. Date: Jan. 15, 2015

(65) Prior Publication Data
US 2015/0317939 A1    Nov. 5, 2015

(30) Foreign Application Priority Data
Jul. 11, 2013   (CN) .......................... 2013 1 0291149

(51) Int. Cl.
G09G 3/36      (2006.01)
G02F 1/1362    (2006.01)

(52) U.S. Cl.
CPC ........... *G09G 3/3648* (2013.01); *G02F 1/1362* (2013.01); *G09G 2300/0426* (2013.01); *G09G 2300/0809* (2013.01); *G09G 2320/028* (2013.01); *G09G 2320/0223* (2013.01)

(58) Field of Classification Search
CPC ..... G09G 3/36; G09G 3/3648; G02F 1/1362
See application file for complete search history.

(56) References Cited

U.S. PATENT DOCUMENTS 7,133,034 B2 * 11/2006 Park ..................... G09G 3/3648
                                                          345/100
8,497,970 B2 *  7/2013 Guo ................... G02F 1/136286
                                                          257/59

(Continued)

FOREIGN PATENT DOCUMENTS

CN    101493615 A    7/2009
CN    103365015 A    10/2013

OTHER PUBLICATIONS

International Search Report Issued Apr. 22, 201; Appln. No. PCT/CN2013/089284.

(Continued)

*Primary Examiner* — Jonathan Boyd
*Assistant Examiner* — Sardis Azongha
(74) *Attorney, Agent, or Firm* — Ladas & Parry LLP

(57) ABSTRACT

An array substrate and a display are provided, and the array substrate includes: a substrate; a pixel region, provided on the substrate; a plurality of data lines, formed on the substrate; a plurality of gate signal lines, formed on the substrate and configured to apply a gate signal; a plurality of pixel units, located in the pixel region and defined by crossing of the plurality of data lines and the plurality of gate signal lines; and at least one leading wire, provided at the periphery of the pixel region and configured to transmit the gate signal, wherein two ends of each of the plurality of gate signal lines near the periphery of the pixel region are connected with one leading wire through a first thin film transistor and a second thin film transistor respectively.

19 Claims, 2 Drawing Sheets

(56) References Cited

U.S. PATENT DOCUMENTS

| | | | |
|---|---|---|---|
| 8,537,327 B2* | 9/2013 | Qin | H01L 27/1288 349/187 |
| 2008/0019166 A1* | 1/2008 | Jung | G02F 1/13454 365/145 |
| 2008/0024418 A1* | 1/2008 | Kim | G09G 3/3648 345/98 |
| 2010/0079715 A1* | 4/2010 | Iki | G02F 1/133345 349/139 |
| 2011/0075062 A1* | 3/2011 | He | G09G 3/3648 349/42 |
| 2013/0257837 A1* | 10/2013 | Wang | G09G 3/3696 345/211 |

OTHER PUBLICATIONS

Written Opinion of the International Searching Authority dated Apr. 8, 2014; PCT/CN2013/089284.

* cited by examiner

ARRAY SUBSTRATE AND DISPLAY

TECHNICAL FIELD

The embodiments of the present invention relate to an array substrate and a display.

BACKGROUND

A thin film transistor liquid crystal display (TFT-LCD), having features of small volume, low power consumption, radiation free and etc., has undergone fast development recently, and its size becomes more and more larger, and its display effect becomes more and more better.

FIG. 1 shows a simple layout of a drive structure of the TFT-LCD, and formed on an array substrate are a gate signal line 101 and a data signal line 102 which are connected to a thin film transistor 103. For such drive structure, each row of gate signal is transmitted by one gate line, especially, in a large-sized liquid crystal display device, a delay may occur when the gate signal line transmit the gate signal, thus a display defect may be caused. Usually, a solution for solving this problem is to increase a wiring width of the gate signal line 101, in turn a resistance of the gate signal line 101 is decreased, thus which helps to decrease the delay of signal transmission. However, as the gate signal line usually is made of opaque metal material, such solution may affect inversely the aperture ratio of the device.

SUMMARY

The embodiments of the present invention provide an array substrate and a display, which can reduce the signal transmission delay and thus improve the resolution of the display without affecting the aperture ratio of a pixel.

On the one hand, the embodiments of the present invention provide an array substrate, comprising: a substrate; a pixel region, provided on the substrate; a plurality of data lines, formed on the substrate; a plurality of gate signal lines, formed on the substrate and configured to apply a gate signal; a plurality of pixel units, located in the pixel region and defined by crossing of the plurality of data lines and the plurality of gate signal lines; and at least one leading wire, provided at the periphery of the pixel region and configured to transmit the gate signal, wherein two ends of each of the plurality of gate signal lines near the periphery of the pixel region are connected with one leading wire through a first thin film transistor and a second thin film transistor respectively.

On the other hand, the embodiments of the present invention provide a display comprising the above array substrate and a counter substrate cell-assembled with the array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the technical solution according to an embodiment of the present invention, at least one leading wire is provided at the periphery of a pixel region, two ends of each gate signal line are connected to one leading wire by using different thin film transistors, for one gate signal line formed on an array substrate, a gate signal may be transmitted at the same time through the gate signal line and the leading wire connected with the gate signal line, each row of gate signal can be transmitted at least through the gate signal line and the leading wire at the same time, and thus, the transmission speed of the gate signal can be enhanced, the delay of the gate signal can be lowered. In addition, as the leading wire is not provided in a pixel region, the aperture ratio of the pixel is not affected and the resolution of the display can be improved.

The main implementing principle, the implementing manner and the corresponding advantageous effect of the technical solution according to the embodiments of the present invention will be detailed hereinafter in connection with the drawings.

Figure 1:
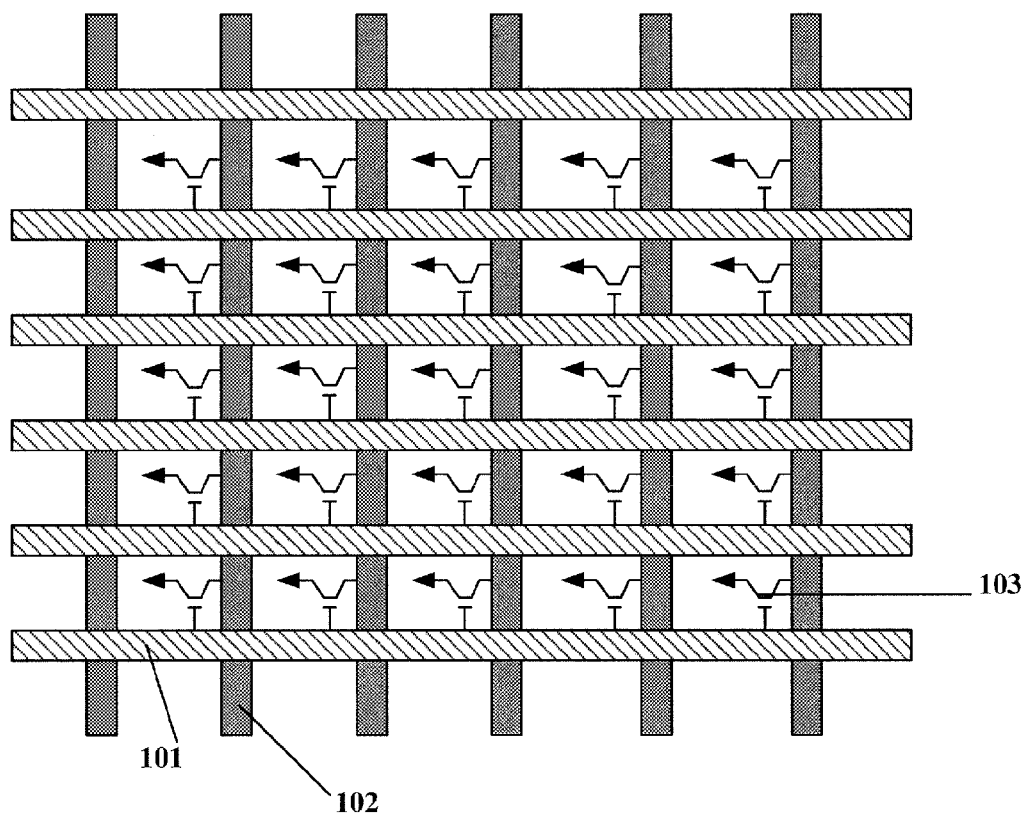
FIG. 1 is a simple layout view of an existing drive structure of an array substrate.
Figure 2:
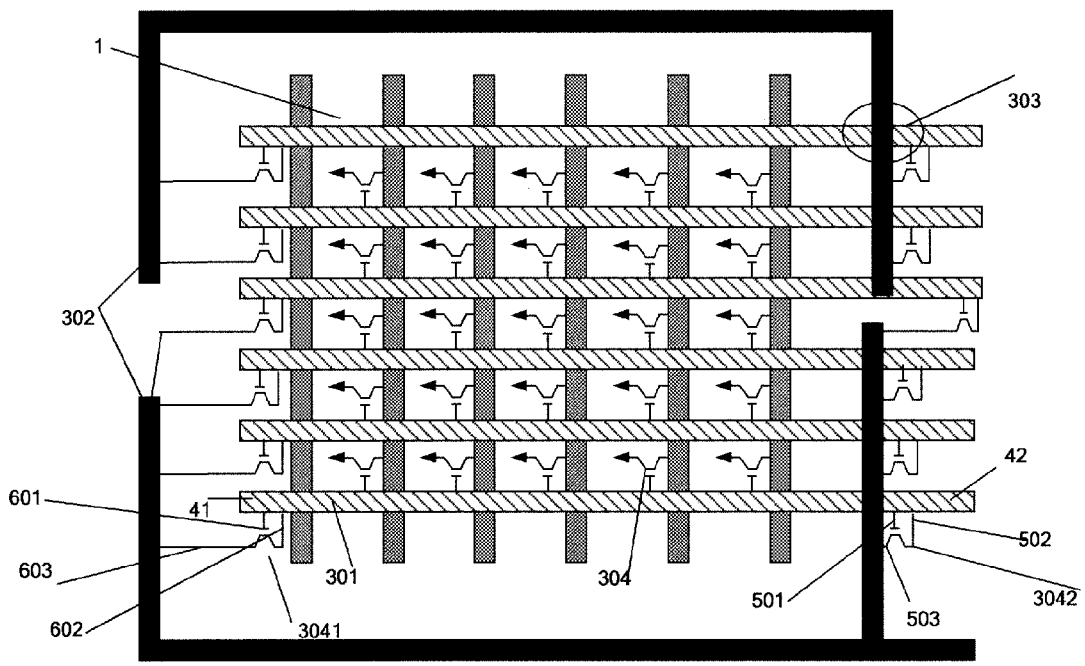
FIG. 2 is a schematic view of a drive structure of an array substrate according to an embodiment of the present invention.

An embodiment of the present invention provides an array substrate, as shown in FIG. 2, comprising:

a pixel region 1, provided on a substrate;

a plurality of gate signal lines 301, configured to provide a gate signal;

a plurality of pixel units, located in the pixel region 1 and defined by crossing of a plurality of data lines and the plurality of gate signal lines; and at least one leading wire 302, provided at the periphery of the pixel region and configured to transmit the gate signal, wherein the leading wires 302 are not connected with each other, and the leading wire 302 is not directly connected with the plurality of gate signal lines 301 in the pixel region.

In the embodiments of the present invention, two leading wires 302 are taken as an example to make a detailed description.

Figure 3:
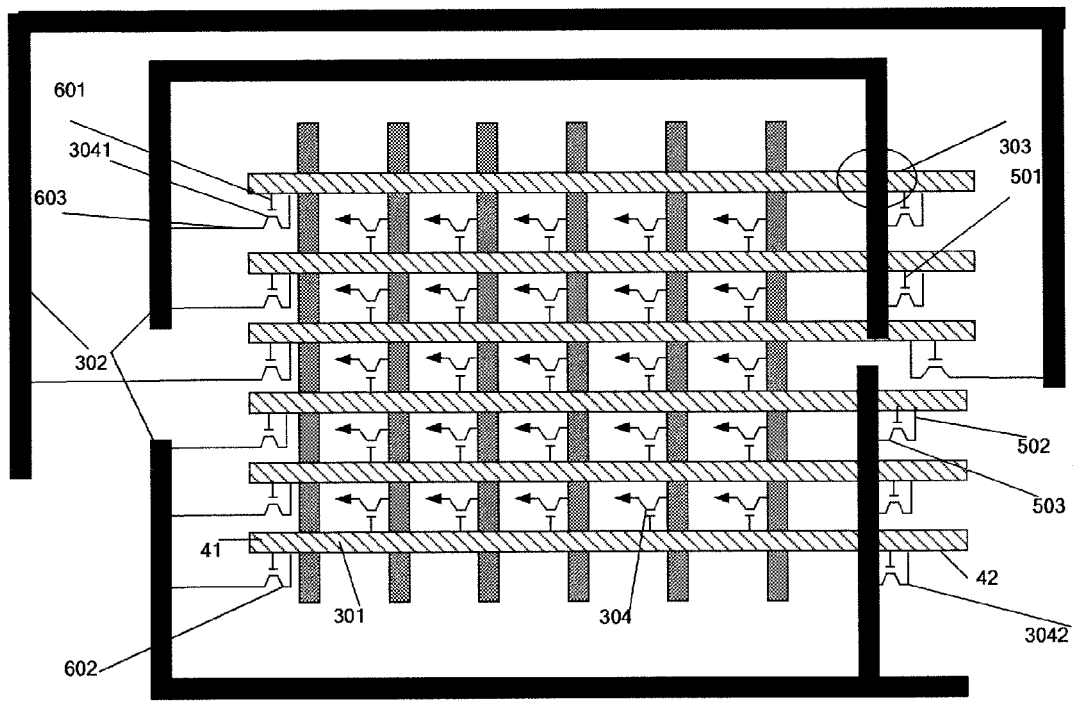
FIG. 3 is a schematic view of a drive structure of an array substrate on which three leading wires are formed according to an embodiment of the present invention.

As shown in FIG. 3, in an overlapping region 303 between the leading wire 302 and the gate signal line 301 of the pixel region, the leading wire 302 may be isolated from the gate signal line 301 of the pixel region through an insulating film (not shown in FIG. 2).

A plurality of first thin film transistors 3041 and a plurality of second thin film transistors 3042 are provided, and two ends of each of the plurality of gate signal lines 301 near the periphery of the pixel region are connected with one of at least two leading wires 302 through the first thin film transistor 3041 and the second thin film transistor 3042, respectively. The first thin film transistor 3041 may be located at an input terminal of a corresponding gate signal line 301, the second thin film transistor 3042 may be located at a transmission tail end of the corresponding gate signal line 301, and a switching-on voltage of the second thin film transistor 3042 is smaller than that of the thin film transistor 304 of each of the pixel units connected with the corresponding gate signal line.

Herein, the first thin film transistor 3041 and the second thin film transistor 3042 provided in the embodiments of the present invention may be identical thin film transistor or different thin film transistors, for example, the first thin film transistor 3041 and the second thin film transistor 3042 may be transistors with identical or different switching-on voltages. If the thin film transistors with the identical switching-on voltage are used, the two ends of each gate signal line 301 near the periphery of the pixel region are connected with the same leading wire 302 through different thin film transistors. As shown in FIG. 3, one end 41 of each gate signal line 301 is connected with one leading wire 302 through one thin film transistor, and the other end 42 of this gate signal line 301 is connected with the same leading wire 302 through one thin film transistor.

Exemplarily, at least two gate signal lines 301 are connected with the same leading wire 302 through different thin film transistors.

Herein, the leading wire 302 may be in a semi-ring shape surrounding the pixel region and at the periphery of the pixel region. Furthermore, the number of the semi-ring shape leading wires at the periphery of the pixel region may be 2 or more. As shown in FIG. 3, the leading wires 301 provided at the periphery of the pixel region may be, but not limited to, two semi-ring shape leading wires at the periphery of the pixel region. Furthermore, the leading wires 301 may also be a plurality of line segments, however, if the leading wires provided at the periphery of the pixel region are a plurality of line segments, on the array substrate, each row of gate signal line may be connected with the same leading wire in the form of line segment so as to transmit the gate signal. In practice, as shown in FIG. 3, a plurality of leading wires in a semi-ring shape may be disposed at the periphery of the pixel region, and when a plurality of leading wires in the semi-ring shape are provided, the leading wires do not overlap each other.

Exemplarily, in the technical solutions provided by the embodiments of the present invention, a width of each of the two leading wires in the semi-ring shape at the periphery of the pixel region may be identical with or different from that of each of the gate signal lines, for example, the width of the leading wire may be slightly larger than that of the gate signal line.

Exemplarily, in the embodiments of the present invention, a resistance of the leading wire may be formed to be smaller than that of the corresponding gate signal line, at this moment, a length of the leading wire provided at the periphery, for example, a length of the semi-ring shape leading wire usually is larger than that of the corresponding gate signal line, thus, the width of the leading wire may be larger than that of the corresponding gate signal line and/or a resistivity of material of the leading wire is smaller than that of material of the corresponding gate signal line. Alternatively, the length, the width and the material resistivity of the leading wire may have other corresponding relationships with those of the corresponding gate signal line, as long as the resistance of the leading wire is made smaller than that of the corresponding gate signal line.

Alternatively, in the embodiments of the present invention, the resistance of the leading wire may also be formed to be larger than or equal to that of the gate signal line.

As shown in FIG. 2, a gap between the two leading wires 302 in the semi-ring shape surrounding the pixel region and at the periphery of the pixel region is larger than or equal to 3 micrometers.

Exemplarily, as shown in FIG. 2, a gate electrode 601 and a drain electrode 602 of the first thin film transistor 3041 may be connected with the gate signal line 301, a source electrode 603 of the first thin film transistor 3041 is connected with the leading wire 302 corresponding to the gate signal line 301; a gate electrode 501 and a drain electrode 502 of the second thin film transistor 3042 is connected with the gate signal line 301, and a source electrode 503 of the second thin film transistor 3042 is connected with the leading wire 302 corresponding to the gate signal line 301.

Exemplarily, the leading wire formed at the periphery of the pixel region may be a metal wire formed by etching a metal film deposited. The metal film may be identical with a metal film forming the source electrode and the drain electrode, or identical with a metal film forming the gate signal line.

Correspondingly, the embodiments of the present invention further provide a display comprising the above array substrate provided by the embodiments of the present invention.

The technical solutions provided by the embodiments of the present invention will be detailed hereinafter through an example.

Figure 4:
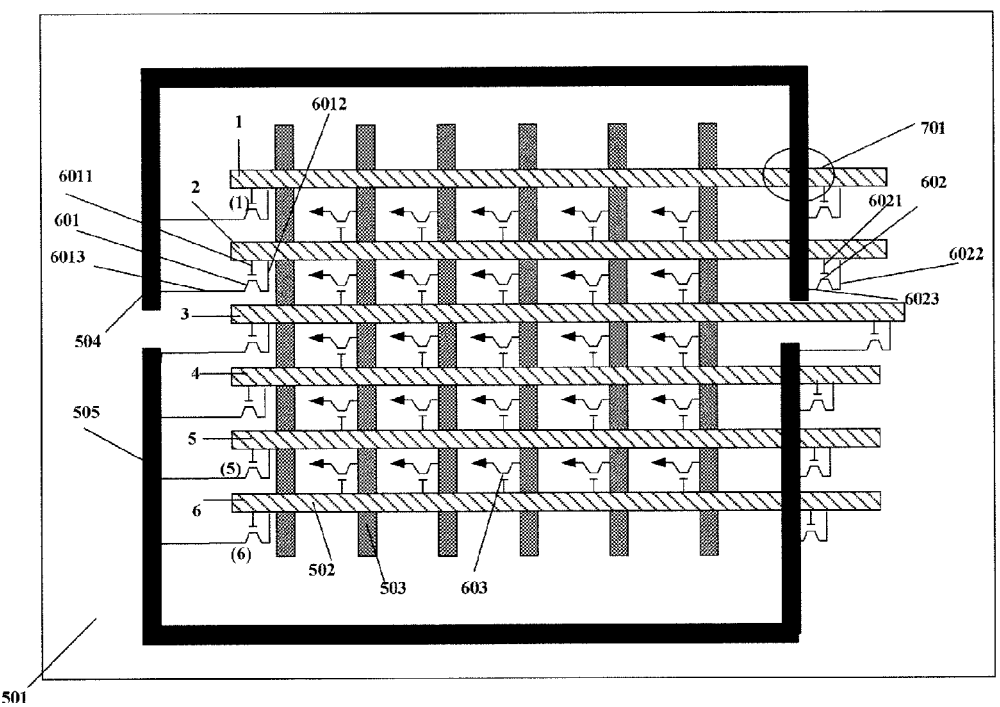
FIG. 4 is a schematic view of a drive structure of an array substrate according to an embodiment of the present invention.

As shown in FIG. 4, an array substrate according to an embodiment of the present invention is shown, and a plurality of gate signal lines 502 are formed on a substrate 501 for providing a gate signal. A plurality of data signal lines 503 are configured to provide a data signal. The first semi-ring shape leading wire 504 and the second semi-ring shape leading wire 505 are provided at the periphery of the pixel region for transmitting the gate signal.

A first semi-ring shape leading wire 504 and a second semi-ring shape leading wire 505 may be disposed in the same metal film layer, for example, the first semi-ring shape leading wire 504 and the second semi-ring shape leading wire 505 may be formed in a layer where an active layer of the array substrate is located, or the first semi-ring shape leading wire 504 and the second semi-ring shape leading wire 505 may be formed in a layer of a gate electrode of the array substrate, or the first semi-ring shape leading wire 504 and the second semi-ring shape leading wire 505 may be located in the same layer with a source/drain electrode of the array substrate. The first semi-ring shape leading wire 504 and the second semi-ring shape leading wire 505 may be disposed in different metal film layers, for example, the first semi-ring shape leading wire 504 is provided in a layer where the active layer of the array substrate is located, and the second semi-ring shape leading wire 505 is provided in a layer of the gate electrode of the array substrate. If the first semi-ring shape leading wire 504 and the second semi-ring shape leading wire 505 are provided in the same metal film layer, the first semi-ring shape leading wire 504 and the second semi-ring shape leading wire 505 do not intersect. The embodiments of the present invention are described in detail taking it as an example that the first semi-ring shape leading wire 504 and the second semi-ring shape leading wire 505 are provided in the same metal film layer, and a gap between the first semi-ring shape leading wire 504 and the second semi-ring shape leading wire 505 is larger than 3 micrometers. For example, the first semi-ring shape leading wire 504 and the second semi-ring shape leading wire 505 are provided in the layer of the gate electrode, and the first semi-ring shape leading wire 504 and the second semi-ring shape leading wire 505 may be isolated with the gate signal line via an insulating layer film at a place where they overlap to each other, or the first semi-ring shape leading wire 504 and the second semi-ring shape leading wire 505 may be disconnected at the place where they overlap to each other and then, may be electrically connected by through holes and wires positioned in another layer . In the embodiments of the present invention, according to the first semi-ring shape leading wire 504 and the second semi-ring shape leading wire 505 provided at the periphery of the pixel region, the gate signal lines 502 formed on the array substrate 501 are divided into two parts which are respectively connected to the first semi-ring shape leading wire 504 and the second semi-ring shape leading wire 505, and the two parts may comprise the same number or different numbers of gate signal lines 502. As shown in FIG. 4, the embodiments of the present invention are detailed taking it as an example that the gate signal lines 502 formed on the array substrate 501 are divided into an upper part and a lower part. For each gate signal line 502 in one part, as shown in FIG. 4, the gate signal line 2 (this is just for convenient description, and the gate signal lines are numbered as 1-6 shown in FIG. 4) is taken as an example for detailed description. As the gate signal lines are also connected with the thin film transistors, for convenient description, the thin film transistors are differentiated in the embodiment of the present invention. The thin film transistors connected with the semi-ring shape leading wires are called the first thin film transistor and the second thin film transistor, and the thin film transistor located in each pixel unit of the pixel region and connected with the gate signal line is called a third thin film transistor. Herein, the first thin film transistor at a signal input terminal and the third thin film transistor may be the same type of thin film transistor or different types of thin film transistors, and a switching-in voltage of the second thin film transistor at the other terminal is smaller than that of the third thin film transistor.

One end of a gate signal line 2 on the array substrate 501 is connected with a gate electrode 6011 and a drain electrode 6012 of a first thin film transistor 601, and a source electrode 6013 of the first thin film transistor 601 is connected with the first semi-ring shape leading wire 504. The other end of the gate signal line 2 on the array substrate 501 is connected with a gate electrode 6021 and a drain electrode 6022 of a second thin film transistor 602, and a source electrode 6023 of the second thin film transistor 602 is connected with the first semi-ring shape leading wire 504. The gate signal line 2 is also connected with the data signal line 503 through a plurality of third thin film transistors 603.

Likewise, for a gate signal line 1 which is divided to be connected with the first semi-ring shape leading wire 504, one end of the gate signal line 1 is connected with a drain electrode 6012 and a gate electrode 6011 of a first thin film transistor 601, and a source electrode 6013 of the first thin film transistor 601 is connected with the first semi-ring shape leading wire 504. The other end of the gate signal line 1 on the array substrate 501 is also connected with a gate electrode 6021 and a drain electrode 6022 of a second thin film transistor 602, and a source electrode 6023 of the second thin film transistor 602 is connected with the first semi-ring shape leading wire 504. In respective pixel unit, the gate signal line 1 is also connected with the data signal line 503 through the third thin film transistor 603. A switching-on voltage of the second thin film transistor 602 is smaller than that of the third thin film transistor 603.

Likewise, the same connection manner is used for the gate signal lines which are divided to be connected with the first semi-ring shape leading wire 504, and a similar connection manner may be used for the gate signal lines which are divided to be connected with the second semi-ring shape leading wire 505, which are not described herein any more.

In the technical solutions provided by the embodiments of the present invention, in an overlapping region 701 between the first semi-ring shape leading wire 504 and the second semi-ring shape leading wire 505 and the gate signal lines 502, an insulating film isolates the semi-ring shape leading wire and the gate signal line.

Exemplarily, as shown in FIG. 4, a working principle of a drive structure of the display provided by the embodiments of the present invention is as follow: description is made with the gate signal line 2 shown in FIG. 4 as an example. A gate-on signal is input from one end of the gate signal line 2, gate signal lines 1, 3 . . . N transmit a gate-off signal, at this moment, the thin film transistor 601 of the gate signal line 2 is switched on, as shown in FIG. 4, just for convenient description, the thin film transistors are numbered, and the thin film transistors of the other gate signal lines, for example, the thin film transistors of the gate signal line 1 are in an off state. A gate switched-on voltage of the gate signal line 2 is input the gate electrode and is input the first semi-ring shape leading wire 504 through the thin film transistor 601 which is switched on, thus, each row of gate signal may be transmitted at the same time through the gate signal line and the semi-ring shape leading wire connected with the gate signal line, that is, each row of gate signal may be transmitted with two metal wires (being the semi-ring shape leading wire and the gate signal line respectively), which is equivalent to increase an area of a cross section of a wire, and correspondingly, a resistance of the wire transmitting a gate signal is decreased, the transmission speed of the gate signal can be enhanced, and the transmission delay of the gate signal is effectively lowered. The other transistors, such as, a thin film transistor 601 connected with the gate signal line 1, are in an off state when the thin film transistor 601 connected with the gate signal line 2 is switched on, thus the gate signal transmitted by the gate signal line 2 will not enter the other gate signal lines.

As shown in FIG. 4, in the technical solutions provided by the embodiments of the present invention, at least one leading wire is formed on the array substrate, several gate signal lines may share the at least one leading wire, thus it is unnecessary to provide too many leading wires. Exemplarily, two semi-ring shape leading wires may be provided at the periphery of the pixel region, under a condition that not too much leading wires are provided, a larger space may be reserved at the periphery of the pixel region, and the contact possibility between the leading wires can be decreased, thus, the yield of the array substrate can be improved. Furthermore, the leading wires provided at the periphery of the pixel region will not affect the aperture ratio of the array substrate, which is applicable to the production of a high-resolution liquid crystal display.

One example of the display according to an embodiment of the present invention is a liquid crystal display, wherein an array substrate and an opposite substrate are disposed to face each other to form a liquid crystal cell, and a liquid crystal material is filled in the liquid crystal cell. The opposite substrate is a color filter substrate, for example. A pixel electrode of each pixel unit of the array substrate is used to apply an electric field, so as to control a rotation of the liquid crystal material and to perform a displaying operation. In some examples, the liquid crystal display further comprises a backlight source provided for the array substrate.

Another example of the display is an organic light emitting display (OLED), wherein a pixel electrode of each pixel unit of an array substrate is used as an anode or a cathode to drive an organic light-emitting material to emit light so as to perform a displaying operation.

In the technical solutions according to the embodiments of the present invention, at least one leading wire is provided at the periphery of a pixel region, two ends of one gate signal line are electrically connected with the leading wire by different thin film transistors, for each gate signal line formed on the array substrate, a gate signal can be transmitted at the same time through the gate signal line and the leading wire connected with the gate signal line, the gate signal in each row can be transmitted at least through the gate signal line and the leading wire at the same time, thus, the delay of the gate signal can be lowered. In addition, as the leading wire is not provided in the pixel region, the aperture ratio of the pixel can be improved, and the resolution of the display can be improved.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. An array substrate, comprising:
a substrate;
a pixel region, provided on the substrate;
a plurality of data lines, formed on the substrate;
a plurality of gate signal lines, formed on the substrate and configured to apply a gate signal;
a plurality of pixel units, located in the pixel region and defined by crossing of the plurality of data ones and the plurality of gate signal lines; and
at least one leading wire, provided at the periphery of the pixel region and configured to transmit the gate signal, wherein two ends of each of the plurality of gate signal lines near the periphery of the pixel region are connected with same one leading wire through a first thin film transistor and a second thin film transistor respectively,
wherein the first thin film transistor is located at an input terminal of a corresponding gate signal line, the second thin film transistor is located at a transmission tail end of the corresponding gate signal line, and a switched-on voltage of the second thin film transistor is smaller than that of a thin film transistor in each of the pixel units connected with the corresponding gate signal line.

2. The array substrate according to claim 1, wherein a number of the leading wire are two or more than two, and the leading wires are insulated from each other.

3. The array substrate according to claim 2, wherein any two leading wires are provided in the same layer or different layers.

4. The array substrate according to claim 3, wherein the leading wires are provided in a layer of an active layer, a layer of a gate electrode, or a layer of a source/drain electrode.

5. The array substrate according to claim 3, wherein one of any two leading wires is provided in a layer of an active layer, and the other of the any two leading wires is provided in a layer of a gate electrode or a layer of a source/drain electrode.

6. The array substrate according to claim 1, wherein a gate electrode and a drain electrode/source electrode of the first thin film transistor is connected with a corresponding gate signal line, the source electrode/drain electrode of the first thin film transistor is connected with a corresponding leading wire; a gate electrode and a drain electrode/source electrode of the second thin film transistor is connected with the corresponding gate signal line, and the source electrode/drain electrode of the second thin film transistor is connected with the corresponding leading wire.

7. The array substrate according to claim 1, wherein the first thin film transistor and the second thin film transistor corresponding to each of the gate signal lines are identical or different thin film transistors, a plurality of first thin film transistors respectively corresponding to the plurality of gate signal lines are identical thin film transistors, and a plurality of second thin film transistors respectively corresponding to the plurality of gate signal lines are identical thin film transistors.

8. The array substrate according to claim 1, wherein at least two of the gate signal lines are respectively connected to the same leading wire through the first thin film transistors and the second thin film transistors respectively corresponding to the at least two of the gate signal lines.

9. The array substrate according to claim 8, wherein the number of the semi-ring shape leading wires surrounding the pixel region at the periphery of the pixel region is two or more.

10. The array substrate according to claim 9, wherein any two semi-ring shape leading wires do not overlap each other and a gap between two adjacent leading wires is larger than or equal to 3 micrometers.

11. The array substrate according to claim 1, wherein the leading wire is in a semi-ring shape surrounding the pixel region at the periphery of the pixel region.

12. The array substrate according to claim 1, wherein each of the leading wires is a line segment provided at the periphery, there are a plurality of the line segments which do not overlap each other, and two ends of each of the gate signal lines are connected to the same line segment.

13. The array substrate according to-claim 1, wherein a width of each of the leading wires is larger than that of each of the gate signal lines.

14. The array substrate according to claim 1, wherein material of the leading wire is the same with that of the gate signal line.

15. The array substrate according to claim 1, wherein in an overlapping region between the leading wire and the gate signal line, an insulating layer film is provided to isolate the leading wire and the gate signal line; or the leading wire is disconnected and connected again through a through hole and a conductive wire in another layer.

16. The array substrate according to claim 1, wherein a width of each of the leading wires is equal to that of each of the gate signal lines and/or a resistivity of material of each of the leading wires is smaller than or equal to that of material of each of the gate signal lines.

17. The array substrate according to claim 1, wherein the first thin film transistor corresponding to each of the gate signal lines is identical with or different from the thin film transistor in each of the pixel units connected with the gate signal line.

18. A display panel, comprising:
   array substrate according to claim 1; and
   a counter substrate, cell-assembled with the array substrate.

19. The array substrate according to claim 1, wherein a resistivity of material of each of the leading wires is smaller than that of material of each of the gate signal lines.

* * * * *